United States Patent
Brimley (10) Patent No.: US 10,509,824 B1
(45) Date of Patent: Dec. 17, 2019

(54) AUTOMATIC CONTENT RECOGNITION SEARCH OPTIMIZATION

(71) Applicant: The Nielsen Company (US), LLC, New York, NY (US)

(72) Inventor: William Brimley, Draper, UT (US)

(73) Assignee: The Nielsen Company (US), LLC, New York, NY (US)

( * ) Notice: Subject to any disclaimer, the term of this patent is extended or adjusted under 35 U.S.C. 154(b) by 708 days.

(21) Appl. No.: 14/736,158

(22) Filed: Jun. 10, 2015

Related U.S. Application Data (60) Provisional application No. 62/086,048, filed on Dec. 1, 2014.

(51) Int. Cl.
*G06F 16/783* (2019.01)
*G06F 16/78* (2019.01)
*G06F 16/9535* (2019.01)

(52) U.S. Cl.
CPC ........ *G06F 16/783* (2019.01); *G06F 16/7867* (2019.01); *G06F 16/9535* (2019.01)

(58) Field of Classification Search
CPC .................. G06F 17/30784; G06F 17/3082
See application file for complete search history.

(56) References Cited

U.S. PATENT DOCUMENTS

| | | | |
|---|---|---|---|
| 7,444,659 B2 | 10/2008 | Lemmons | |
| 7,546,619 B2 | 6/2009 | Anderson et al. | |
| 9,015,741 B2 | 4/2015 | Gordon | |
| 2003/0061239 A1* | 3/2003 | Yoon | G06F 17/30017 |
| 2005/0144455 A1* | 6/2005 | Haitsma | G06F 17/30743 |
| | | | 713/176 |
| 2005/0240569 A1* | 10/2005 | Cheng | G06F 17/30427 |
| 2008/0270373 A1* | 10/2008 | Oostveen | G06F 17/30825 |
| 2011/0135283 A1* | 6/2011 | Poniatowki | H04N 5/76 |
| | | | 386/297 |

(Continued)

OTHER PUBLICATIONS

López-Nores, Martín, et al., "MiSPOT: Dynamic Product Placement for Digital TV through MPEG-4 Processing and Semantic Reasoning," Knowledge and Information Systems at 22, No. 1, pp. 101-128 (2009).

(Continued)

*Primary Examiner* — Jensen Hu
(74) *Attorney, Agent, or Firm* — McDonnell Boehnen Hulbert & Berghoff LLP (57) ABSTRACT

A processing device and a method are disclosed in which instructions are executed to determine, from a fingerprint of television content being consumed by a user, what program the user is watching so that program information may be sent for use by a smart device streaming the content to the user. The fingerprint may be compared with a database of fingerprints to find a match. The database may include fingerprints of favorite programs or of previously watched programs. The search may be narrowed according to the user's favorite programs or according to a subset of programs most likely to be watched, e.g., from a chronological history of programs the user usually watches and/or those that viewers in general usually watch in chronological order. When narrowed searches fail to find a fingerprint match, larger subsets up to and including the entire database may be searched for a match.

21 Claims, 7 Drawing Sheets

(56) References Cited

U.S. PATENT DOCUMENTS

| | | | |
|---|---|---|---|
| 2011/0161242 A1* | 6/2011 | Chung | G06Q 30/00 |
| | | | 705/347 |
| 2013/0031582 A1 | 1/2013 | Tinsman et al. | |
| 2013/0054645 A1* | 2/2013 | Bhagavathy | G06F 17/30784 |
| | | | 707/780 |
| 2013/0166590 A1* | 6/2013 | Kim | G06F 17/30038 |
| | | | 707/769 |
| 2013/0205315 A1 | 8/2013 | Sinha et al. | |
| 2014/0007162 A1 | 1/2014 | Harrison | |
| 2014/0052737 A1* | 2/2014 | Ramanathan | G06F 17/30799 |
| | | | 707/747 |
| 2014/0074621 A1 | 3/2014 | Chai et al. | |
| 2014/0196085 A1 | 7/2014 | Dunker et al. | |
| 2015/0365729 A1* | 12/2015 | Kaya | H04N 21/4826 |
| | | | 725/14 |
| 2017/0116347 A1* | 4/2017 | Hoover | G06F 17/30867 |

OTHER PUBLICATIONS

Gracenote, "Gracenote Takes on Targeted Advertising," at http://www.gracenote.com/events/targeted_advertising/, accessed Nov. 6, 2014.

* cited by examiner

AUTOMATIC CONTENT RECOGNITION SEARCH OPTIMIZATION

CROSS-REFERENCE TO RELATED APPLICATION

This application claims the benefit of U.S. Provisional Application No. 62/086,048, filed Dec. 1, 2014, the entire disclosure of which is incorporated herein by this reference.

BACKGROUND

Content feeds may be generated at a central location and distributed to a variety of locations. For example, a television channel may be distributed from a content provider to a number of local broadcasters, and ultimately to individual televisions of users. The televisions may include or be coupled with a smart device capable of receiving and acting on program information, such as, for example, in order to provide the program information to the user and/or to target the user with useful advertising based on subject matter of the content. However, the smart device does not always know what program the user is watching.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Media content broadcasting or streaming, such as television (TV) show broadcasting, can be an engaging venue to advertise products and services or provide information to viewers. Accordingly, broadcasters want to know what programs individual viewers are watching, and when, so that subject matter of those programs may be used to accurately target advertising and other useful, optionally non-commercial, information to the viewers. Non-commercial may include, for example, news alerts, announcements or educational information. It would therefore be advantageous to determine a program a user is watching or is about to watch, and to send program information to a smart device related to that program, for use in such targeting actions. For more effective targeting, an automatic content recognition (ACR) system may determine a program being (or about to be) watched to a sufficiently high degree of certainty.

More specifically, the ACR system may determine, from a fingerprint of television content being consumed by a user, what program the user is watching so that program information may be sent for use by a smart device streaming the content to the user. The fingerprint may be compared with a database of fingerprints to find a match. The database may include fingerprints of favorite programs or of previously watched programs. The search may be narrowed according to the user's favorite programs or according to a subset of programs most likely to be watched, e.g., from a chronological history of programs the user usually watches and/or those that viewers in general usually watch in chronological order. When narrowed searches fail to find a fingerprint match, larger subsets up to and including the entire database may be searched for a match.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film."

In one embodiment, a content overlay system or a content overlay device may enable combining media content with specific, timely, and/or targeted overlay content such as advertising. The content overlay system or content overlay device may enable overlay content providers to engage with viewers by inviting the viewers to respond to a call to action within the content overlays (e.g., an invitation to engage the content overlay). One advantage of inviting the viewers to a call to action may be to provide a return path or follow-up path for the viewers to request additional information, ask questions, provide input, contact a provider of a service or product advertised, and so forth. Another advantage of inviting the viewer to a call to action may be to provide a return path or follow up path for the advertisers to provide additional information, further engage the viewers, gather additional information about the viewers, answer viewer questions about the product or service advertised, and so forth. In another example, the content overlay system or the content overlay device may enable an advertiser to use cross platform retargeting campaigns once a viewer has viewed and/or interacted with an overlay content.

Figure 1:
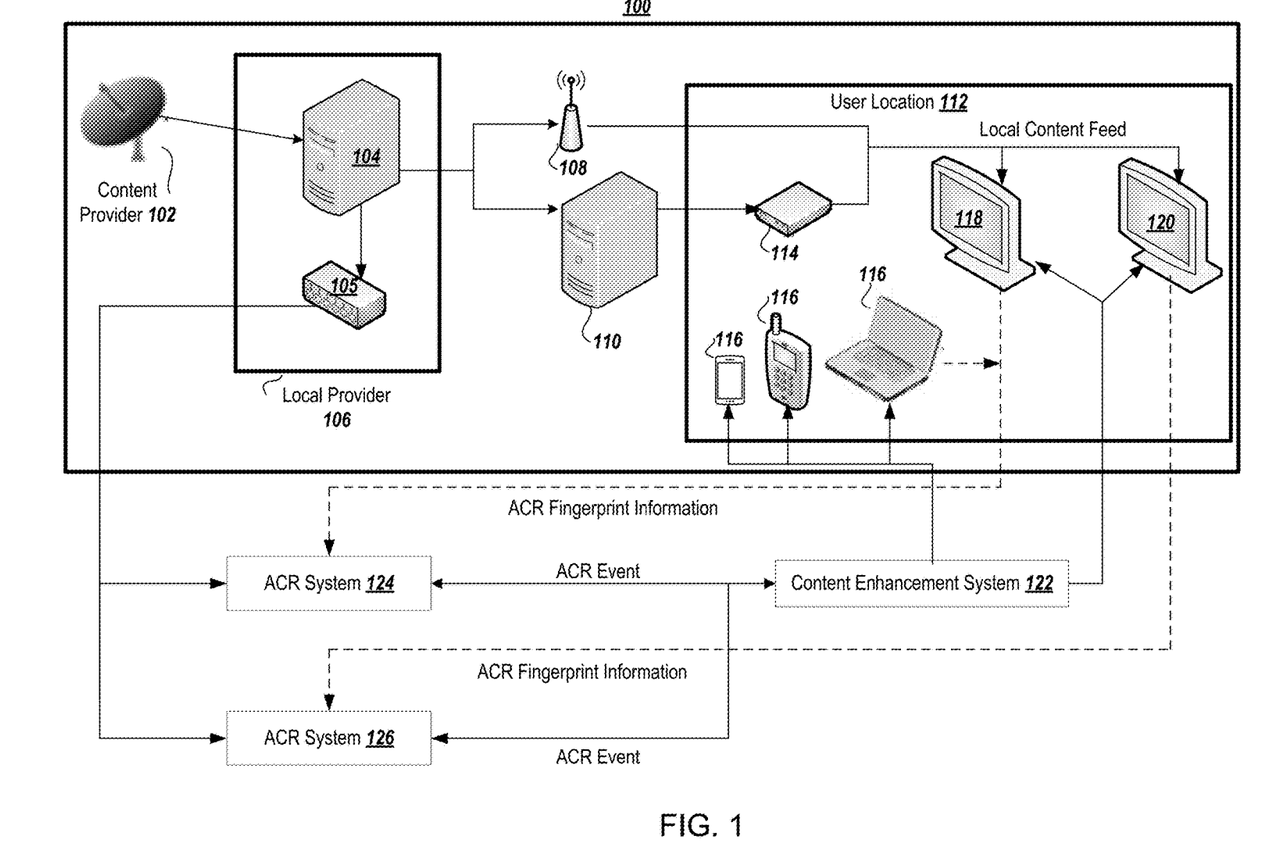
FIG. 1 illustrates a system diagram of a content distribution network according to one embodiment.

FIG. 1 illustrates a system diagram of a content distribution network 100 according to one example. In the content distribution network 100 a content provider 102 may broadcast a content feed to a local provider 106. The local provider 106 may include a headend 104 and an automatic content recognition (ACR) fingerprinter server 105. The content feed from the content provider 102 may be received at the headend 104 of the local provider 106. The headend 104 may generate a local content feed based on the received content feed. For example, the headend 104 may be a local affiliate broadcaster receiving a network channel with programming and advertisements from a national or global broadcaster.

The headend 104 may communicate the local content feed to the ACR fingerprinter server 105, an over-the-air (OTA) broadcaster 108, and/or a multichannel video programming distributor (MVPD) 110. The OTA broadcaster 108 and/or the MVPD 110 may communicate the local content feed to client devices 118 and/or 120. In one example, the OTA broadcaster 108 may broadcast the local content feed using traditional local television or radio channels. In this example, the client devices 118 and 120 may include antennas (such as TV or radio antennas) and receive the local content feed. In another example, the MVPD 110 (such as cable or satellite broadcaster) may communicate the local content feed to a set top box 114. In this example, the set top box 114 may format the content feed for the client devices 118 and 120 and may communicate the formatted content feed to the client devices 118 and 120. The client devices 118 and 120 may include a display device, such as a television screen or a touch screen, to display the local content to a viewer. Various components of the content distribution network 100 may be integrated or coupled to the client devices 118 and 120. For example, a smart television 118 or 120 may include the antennas, the set-top box 114, and a display device in a single unit.

The ACR fingerprint server 105 may analyze the local content feed and determine fingerprint information (e.g., fingerprints). The ACR fingerprint server 105 may communicate the fingerprints to the ACR systems 124 and/or 126. The ACR systems 124 and 126 may be different ACR systems selected by device manufacturers, such as smart TV manufacturers. In one example, the ACR fingerprint server 105 may format fingerprints for the different ACR systems 124 and 126. The ACR systems 124 and 126 may establish communication connections with the different client devices 118 and 120, respectively. The client devices 118 and 120 may communicate ACR fingerprint information to the ACR systems 124 and 126, respectively.

When the ACR system 124 or 126 receives ACR fingerprint information from the client devices 118 and/or 120, the ACR system 124 or 126 may match the received fingerprints with those generated by the ACR fingerprint server 105. When a match occurs and the content of a user program has been identified, the ACR system 124 or 126 may communicate ACR events to a content enhancement system 122. In another example, the ACR systems 124 and 126 may receive ACR fingerprint information from the client devices 118 and/or 120 and may match the received fingerprints with those generated by the ACR fingerprint server 105. When a match occurs and the content of a user program has been identified, the ACR system 124 or 126 may notify the client device 118 or 120 of ACR events. The client device 118 or 120 may then communicate those ACR events to a content enhancement system 122. The ACR fingerprint information may include: a displaying of advertisements in the local content feed to a viewer, a displaying of selected or flagged content in the local content feed to a viewer, a changing of a content channel at the client device 118 or 120, and so forth.

The content enhancement system 122 and the client devices 118 and 120 may include communications interfaces to communicate information, such as overlay content, between the client devices 118 and 120 and the content enhancement system 122. In one example, the communication interface may communicate the information using a cellular network and/or a wireless network. In one example, the communications network may be a cellular network that may be a third generation partnership project (3GPP) release 8, 9, 10, 11, or 12 or Institute of Electronics and Electrical Engineers (IEEE) 802.16p, 802.16n, 802.16m-2011, 802.16h-2010, 802.16j-2009, 802.16-2009. In another embodiment, the communications network may be a wireless network (such as a wireless fidelity (Wi-Fi) network) that may follow a standard such as the IEEE 802.11-2012, IEEE 802.11ac, or IEEE 802.11ad standard. In another embodiment, the communications network may be a Bluetooth connection such as Bluetooth v1.0, Bluetooth v2.0, Bluetooth v3.0, or Bluetooth v4.0. In another embodiment, the communications network may be a Zigbee connection such as IEEE 802.15.4-2003 (Zigbee 2003), IEEE 802.15.4-2006 (Zigbee 2006), IEEE 802.15.4-2007 (Zigbee Pro).

In one example, the content enhancement system 122 may also instruct the client devices 118 and/or 120 to replace portions of the local content feed received from the OTA broadcaster 106 or the MVPD 110 with overlay content. In another example, the content enhancement system 122 may instruct the client devices 118 and/or 120 to overlay or superimpose overlay content onto portions of the local content feed. The content enhancement system 122 may aggregate ACR events across multiple ACR systems 124 and 126 and may communicate overlay content to different client devices 118 and 120 (such as client devices from different device manufacturers).

The content enhancement system 122 may also establish communication connections with other devices 116. In one example, the other device 116 may communicate with the client devices 118 and/or 120 and provide an additional screen (e.g., a second screen) to display overlay content. For example, the client devices 118 and 120 may receive the local content feed from the OTA broadcaster 108 or the MVPD 110 and display the local content feed to the user. The other devices 116 may also communicate ACR fingerprint information to the ACR systems 124 and 126 when an ACR event occurs, as discussed in the preceding paragraphs. When the content enhancement system 122 receives the ACR fingerprint information, the content enhancement system 122 may communicate overlay content to the other devices 116.

Figure 2:
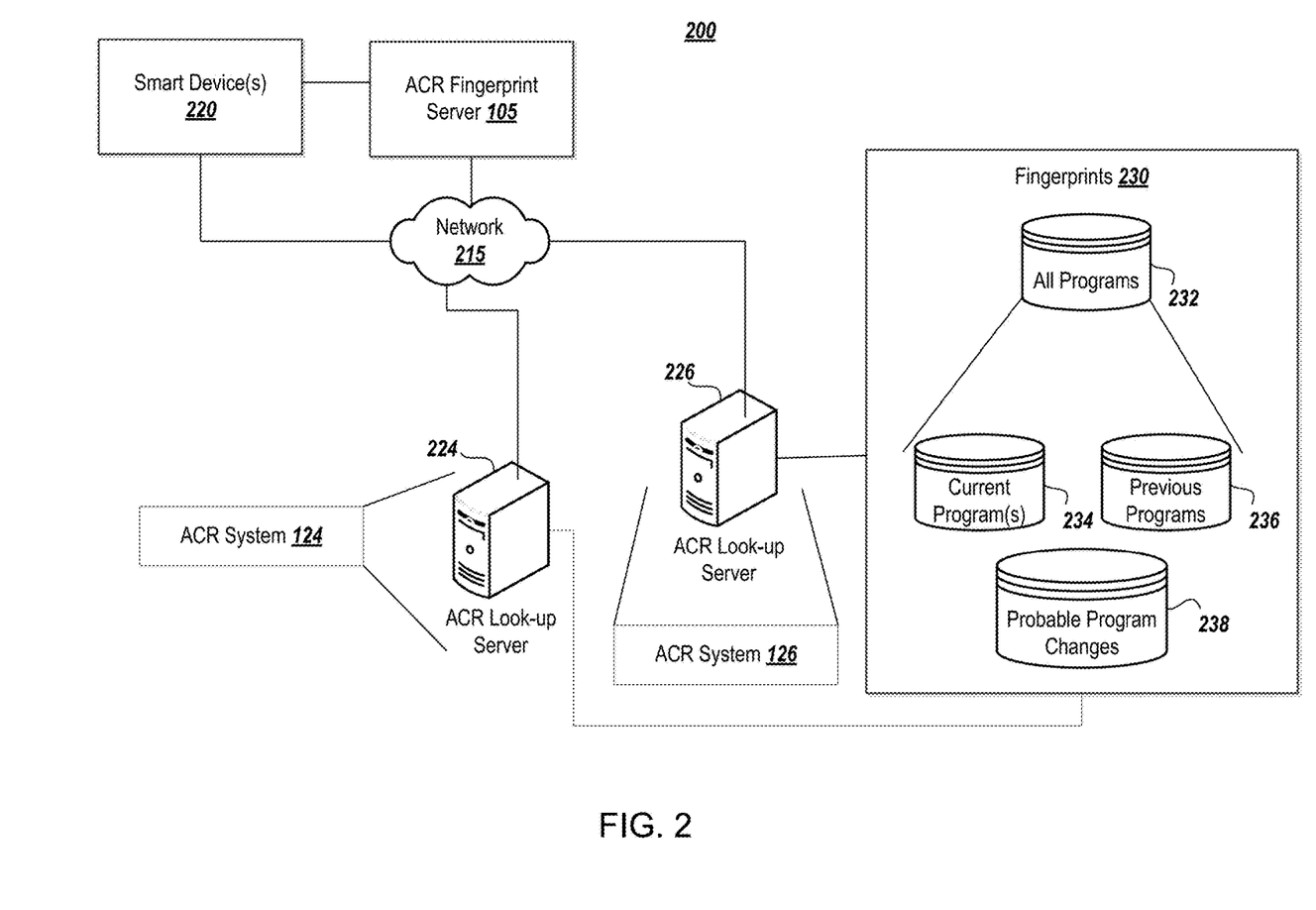
FIG. 2 illustrates a content recognition system to determine a program from a fingerprint received from a smart device that streams media content.

FIG. 2 illustrates a content recognition system 200 to determine a program from a fingerprint received from a smart device that streams media content. The content recognition system 200 may include a network 215 and one or more smart devices 220 that communicate with the ACR system 124 or 126, which were discussed with reference to FIG. 1. The network 215 may be a cellular network and/or a wireless network as discussed in a preceding paragraph. The ACR systems 124 and 126 may include, respectively, an ACR look-up server 224 and an ACR look-up server 226.

The ACR look-up servers 224 or 226 may include or have access to computer-readable storage medium to include storage of fingerprints and corresponding program identifications and program information. For example, the computer-readable medium may include a fingerprints database 230 with a plurality of fingerprints associated with a plurality of television programs (or other media content) from which the fingerprints have been derived. The fingerprints database 230 may include an all programs database 232 storing substantially all the fingerprints, program identifications and program information for programs that a local provider provides to the client devices 118 and 120, for example.

The all programs database 232 may be further divided or sectioned into a current programs database 234, a previous programs database 236 and/or a probably program changes database 238. The current programs database 234 may be a subset of the programs within the all programs database 232 that are currently being streamed to the client devices 118 or 120 and/or the set top box 114. The previous programs database 236 may be a subset of the programs within the all programs database 232 that are identified for respective viewers (e.g., for respective set top boxes 114 and/or client devices 118 and 120) as having been previously viewed. The previous programs database 236 may further be a subset of favorite programs of respective viewers and/or favorite programs of viewers generally. The probably program changes database 238 may be generated from a statistical analysis of program viewing behavior as to programs likely to be watched after watching certain other programs, as will be discussed in more detail.

The smart devices 220 may be the client devices 118 and 120, e.g., smart televisions, or be the headend 114, which in some embodiments is incorporated with the client device 118 or 120. In alternative examples, the smart devices 220 may include the headend 104, the ACR finger printer server 105, the OTA broadcaster 108 and/or the MVPD 110. When a fingerprint is generated or captured at other than the client devices 118 and 120 or the headend 114, the smart devices 220 may monitor content being streamed to the client devices 118 and 120 and/or the head end 114 of respective viewers to determine a fingerprint of content currently being viewed. Accordingly, whatever may be considered as a smart device is unimportant to execution of the disclosed embodiments.

The smart devices 220 may fingerprint the media content in their respective fingerprint formats. In one example, fingerprints may be generated by fingerprinting every frame of a feed, every other frame of the feed, and so forth. For example, the smart devices 220 may generate a fingerprint for a frame of the feed by performing a discrete cosine transform (DCT) of the frame and designating a subset of the resulting coefficients (e.g., the low-frequency coefficients) as the fingerprint. The smart devices 220 may communicate ACR fingerprint information to their respective ACR systems 124 or 126. Each fingerprint of a segment of the feed may be associated with a time index. The time index may be a time of a clock when the segment of the feed was received by the ACR look-up server 224 or 226. The time index may be a number of frames in the feed from an arbitrary starting point. The look-up server 224 or 226 may store the fingerprints in association with the time.

The smart devices 220 may include an ACR client that may periodically, continuously, or semi-continuously communicate user fingerprint information to their respective look-up server 224 or 226. The look-up server 224 or 226 may determine when there may be a match between the ACR fingerprint information and the client fingerprint information. When there is a positive match, the look-up server 224 or 226 may communicate a positive match indicator to the respective ACR client. The look-up server 224 or 226 may also, or alternatively, send program information or the like for the matching program to the ACR client that may be used to target additional programming-related advertising or non-commercial information to users of the respective client devices 118 and 120.

There may be at least two kinds of ACR searches: cold and hot. A cold search may determine content being consumed and a hot search may determine whether the same content as previously determined is being consumed. In other words, a hot search may use results of previous cold searches to inform the identification of consumed content.

In one embodiment of a cold search, when a smart device 220, such as smart television set, is turned on, the smart device 220 may query the ACR look-up server 224 or 226 with a fingerprint based on the content being consumed (e.g., the television program being viewed). In response, the ACR look-up server 224 ort 226 may search the all programs database 232 of fingerprints of content to find a match. When the ACR look-up server 224 or 226 finds a match, the ACR look-up server 224 ort 226 may return corresponding program information about the content associated with the matched fingerprint. The program information may include, but not be limited to, program identification (ID), subject matter, beginning and ending times, timing of commercials, other advertisements or displayed information and the like.

In one embodiment of a hot search, once a smart device 220 knows the content currently being consumed, the smart device 220 may query the ACR look-up server 224 or 226 with a fingerprint and information about the content. The information allows the ACR look-up server to narrow its search of the database to the content currently being consumed. When the fingerprint is not matched in the narrowed search, the ACR look-up server may perform a search of the entire all programs database 232.

A common viewing habit is to switch back and forth between two programs. This may happen when watching sporting events, for example. Although much of the time may be spent watching a particular game, at other times, the viewer may switch to a different game for a couple of minutes to see how that game is going. The ACR look-up server 224 or 226 may take advantage of this behavior when performing a search. Rather than querying the all programs database 232 with only a fingerprint and information about the content currently being consumed, the ACR look-up server 224 or 226 may query the all programs database 232 with the fingerprint in addition to first information about the content currently being consumed and second information about the content that was most recently being consumed. The query may include additional information about other recently consumed content. The previous programs database 236 may include a narrowed subset of programs of recently consumed content that may be more quickly searched than the all programs database 232.

The ACR look-up server 224 or 226 may, therefore, narrow its search of the all programs database 232 to the content currently being consumed such as may be stored in the current programs database 236. When the fingerprint is not found in the narrowed search, then the ACR look-up server may narrow its search to the previous programs database 236 to find a match of a program which was previously being viewed. When the fingerprint is not found by that narrowed search, then the entire database may be searched.

FIGS. 3 through 6 include flow charts, respectively 300, 400, 500 and 600, of methods of identifying a program matching a fingerprint of user-consumed media content according to various embodiments. Different steps may be combined in different ways across the various methods as discussed in FIGS. 3 through 6, without limitation.

Figure 3:
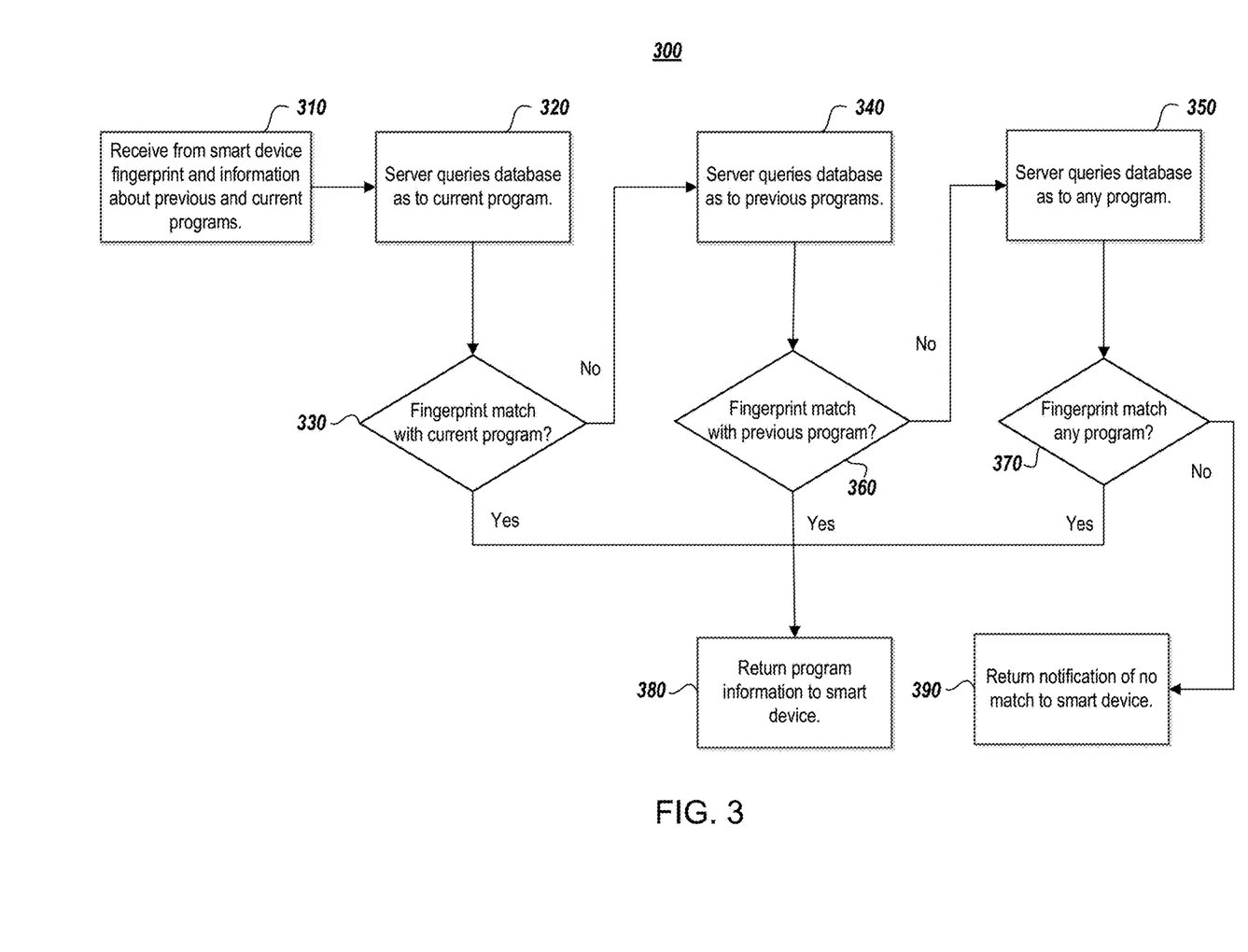
FIG. 3 illustrates a flow chart of a method of identifying a program matching a fingerprint of user-consumed media content according to one embodiment.

With reference to the flow chart 300 of FIG. 3, the ACR look-up server 224 or 226 may receive, from a smart device, a fingerprint and information about previous and current content of programs viewed by a user (310). In response, the ACR look-up server may query the current programs database 234 (320) to see whether the fingerprint matches a fingerprint of a current program (330). When the fingerprint matches a fingerprint of a current program, the ACR look-up server may return program information to the smart device (380). When the fingerprint from the smart device does not match a fingerprint of a current program, the ACR look-up server may query the previous programs database 236 (340) to determine whether the fingerprint matches a fingerprint of a previously viewed program (360). When the fingerprint matches a fingerprint of a previously viewed program, the ACR server may return corresponding program information to the smart device (380). When the fingerprint from the smart device does not match a fingerprint of a current or previously viewed program, the ACR look-up server may query the all programs database 232 (350) to determine whether the fingerprint matches a fingerprint of any program accessible by the ACR look-up server (370). When the fingerprint matches a fingerprint of any program in the database 232, the ACR look-up server may return corresponding program information to the smart device (380). When the fingerprint from the smart device does not match a fingerprint of any program in the database 232, the ACR look-up server may return a notification indicating that no match was found (390).

An ACR look-up server 224 or 226 may also take advantage of knowing a user's favorite programs when performing a search, such as a cold search. The smart device that communicates with the ACR system 124 or 126 may send content consumed on a regular basis by a user to the ACR look-up server. The ACR look-up server may narrow its search of the all programs database 232 to the favorite programs associated with a user, e.g., as may be pre-indexed within the previous programs database 236. When the fingerprint is not found in the narrowed search, then the all programs database 232 may be searched.

Figure 4:
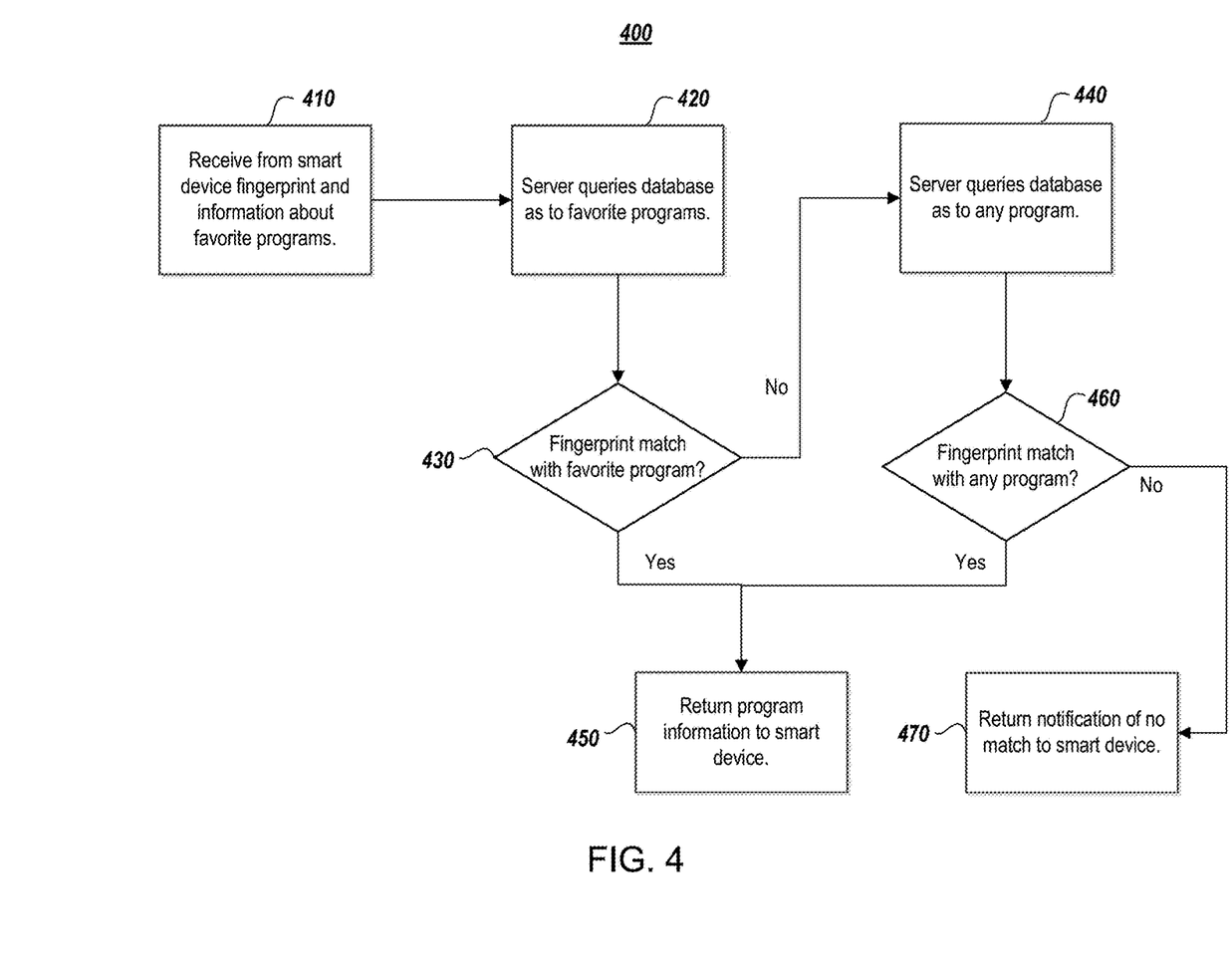
FIG. 4 illustrates a flow chart of a method of identifying a program matching a fingerprint of user-consumed media content according to another embodiment.

More specifically, with respect to FIG. 4, the ACR look-up server 224 or 226 may receive, from a smart device, a fingerprint of the content of a program currently being consumed and information about favorite programs of a user (410). In response, the ACR look-up server may query the previous programs database 236 (420) to see whether the fingerprint matches a fingerprint of a favorite program (430). When the fingerprint matches a fingerprint of a favorite program, the ACR look-up server may return corresponding program information to the smart device (450). When the fingerprint from the smart device does not match a fingerprint of a favorite program, the ACR look-up server may query the all programs database 232 (440) to determine whether the fingerprint matches a fingerprint of any program accessible by the ACR look-up server (460). When the fingerprint matches a fingerprint of any program within the database 232, the ACR look-up server may return corresponding program information to the smart device (450). When the fingerprint from the smart device does not match a fingerprint of any program in the database 232, the ACR look-up server may return a notification indicating that no match was found (470).

The ACR look-up server 224 or 226 may also take advantage of knowledge of a sequence of programs that a user watches. By tracking a sequence of programs that a user watches, the ACR look-up server may populate the probable program changes database 238. For example, the ACR look-up server may determine that when a user finishes watching "Program A" that there is a 70% chance that the user will switch to "Program B," a 20% chance the user will switch to "Program C," and a 10% chance the user will switch to "Program D." With such probability information, and determining a program the user is currently watching, the ACR look-up server may significantly increase the likelihood of determining the program the user will watch next, and thus greatly reduce the programs against which to match a fingerprint of current content being consumed. In one embodiment, the ACR look-up server may include a program within the program changes database 238 when the likelihood that the user is watching or will watch the program is above a threshold probability (e.g., 60% or 70% or some other probability).

For example, the ACR look-up server 224 or 226 may take advantage of this probability information to narrow its search of the all programs database 232 with or without knowing the particular user. Thus, the probability information may be based on viewing habits of a particular user or of the general viewing populace. Such probability information may be generated based on a time of day without reference, necessarily, to previously viewed programs. In another embodiment, the sequential timing of a program may be combined with information regarding previously watched programs of a user to determine a program likely being currently watched by the user.

Figure 5:
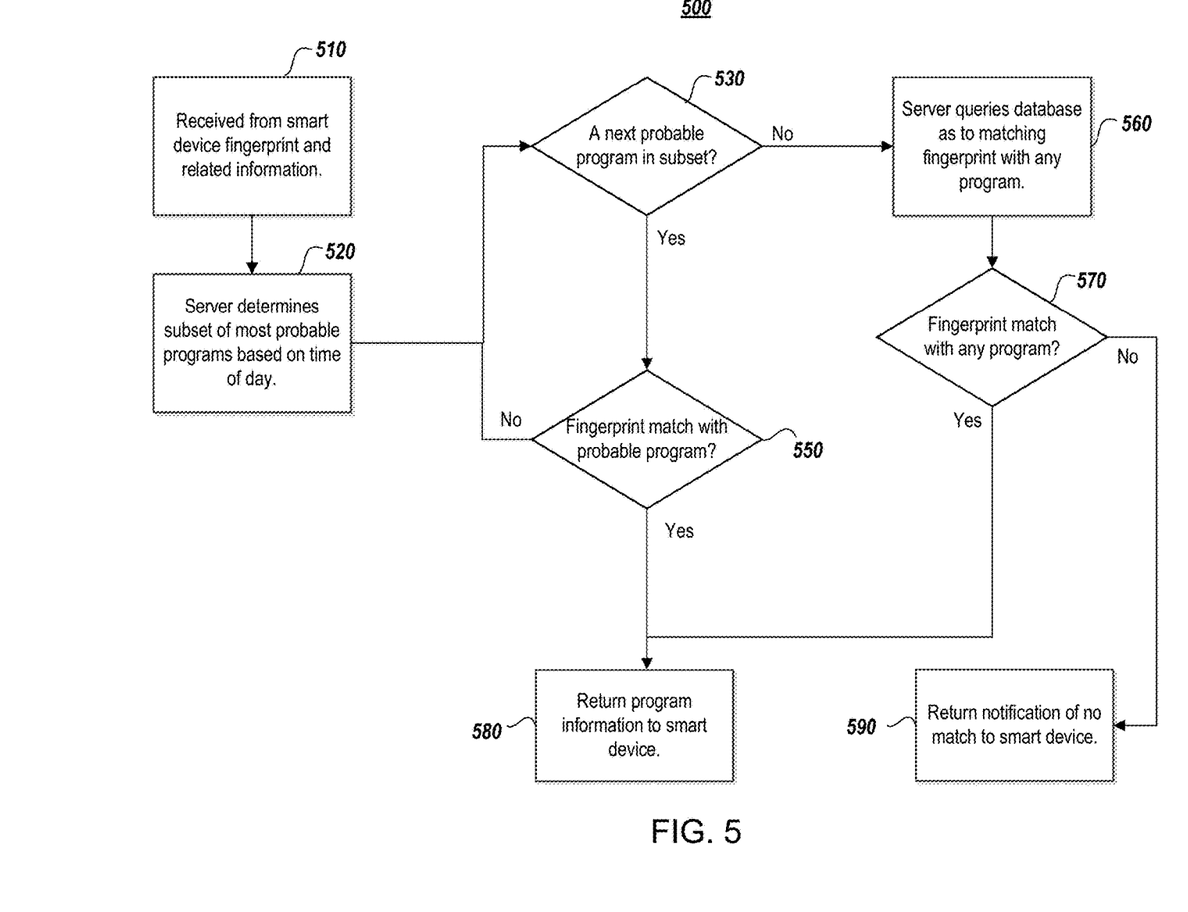
FIG. 5 illustrates a flow chart of a method of identifying a program matching a fingerprint of user-consumed media content according to yet another embodiment.

More specifically, and with respect to FIG. 5, the ACR look-up server 224 or 226 may receive a fingerprint of the content of a program currently being consumed from a smart device (510). The ACR look-up server may also determine a subset of most probable programs based on the statistical analysis just discussed in relation to time of day (520). The ACR look-up server may then determine whether there is a next probable program in the subset (530), e.g., starting with the most likely first. When yes, the ACR look-up server may next determine whether the received fingerprint matches a fingerprint of the selected probable program (550). When the fingerprint matches a fingerprint of the probable program, the ACR look-up server may return corresponding program information to the smart device (580). When the fingerprint from the smart device does not match a fingerprint of the probable program, the ACR look-up server may move to a next probable program in the subset of most probable programs (530). When the fingerprint does not match a fingerprint of any probable program in the subset of most probable programs, the ACR look-up server may query the all programs database 232 (560) to determine whether the fingerprint matches a fingerprint of any program in the database 232 (570). When the fingerprint matches a fingerprint of any program in the database 232, the ACR look-up server may return corresponding program information to the smart device (580). When the fingerprint from the smart device does not match a fingerprint of any content in the database 232, the ACR server may return a notification indicating that no match was found (590).

Figure 6:
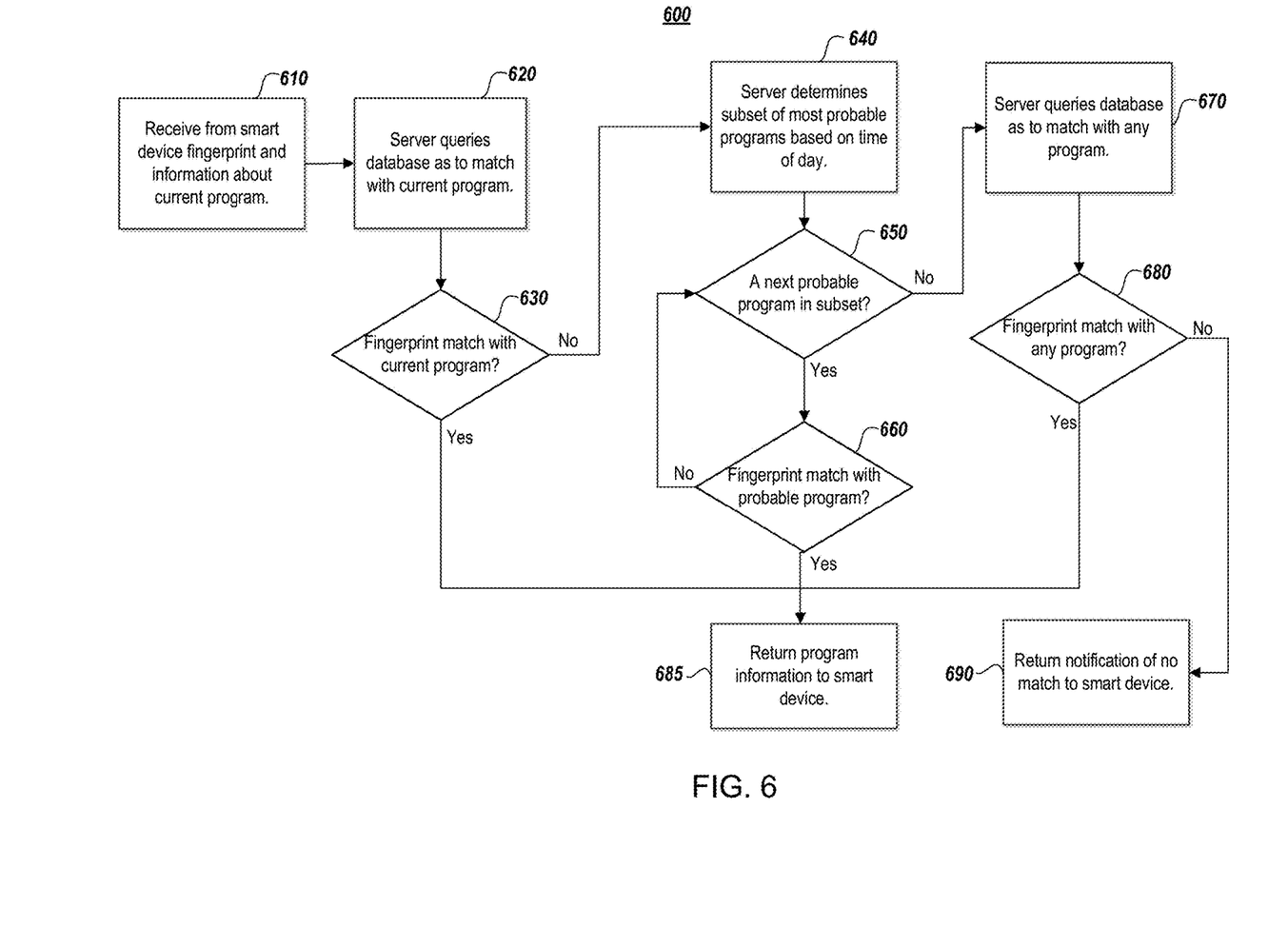
FIG. 6 illustrates a flow chart of a method of identifying a program matching a fingerprint of user-consumed media content according to still another embodiment.

With respect to FIG. 6, the ACR look-up server 224 or 226 may receive a fingerprint and related information of the content of a program currently being consumed from a smart device (610). In response, the server may query the current content database 234 (620) to determine whether the fingerprint matches a fingerprint of a current program (630). When the fingerprint matches a fingerprint of a current program, the ACR look-up server may return corresponding program information to the smart device (685). When the fingerprint from the smart device does not match a fingerprint of a current program, the ACR look-up server may determine a subset of most probable programs viewed by the user based on the time of day (640). The programs within the subset of most probable programs may be listed in order of probability.

The ACR look-up server may further determine whether there is a probable program in the subset of probable programs (650). If so, the ACR look-up server may determine whether the fingerprint matches a fingerprint of the probable program (660). When the fingerprint matches a fingerprint of the probable program, the ACR look-up server may return corresponding program information to the smart device (685). When the fingerprint from the smart device does not match a fingerprint of the probable program, the ACR look-up server may move to a next probable program in the subset of most probable programs, e.g., the next probable program in the list (650). When the fingerprint does not match a fingerprint of any probable program, the ACR look-up server may query the all programs database 232 (670) to determine whether the fingerprint matches a fingerprint of any program in the database 232 (680). When the fingerprint matches a fingerprint of any program in the database 232, the ACR look-up server may return corresponding program information to the smart device (685). When the fingerprint from the smart device does not match a fingerprint of any program in the database, the ACR look-up server may return a notification indicating that no match was found (690).

Such optimized searching may allow faster searches of the database and require less time and processing power. This may reduce the amount of hardware needed to provide a response to a service search request.

Figure 7:
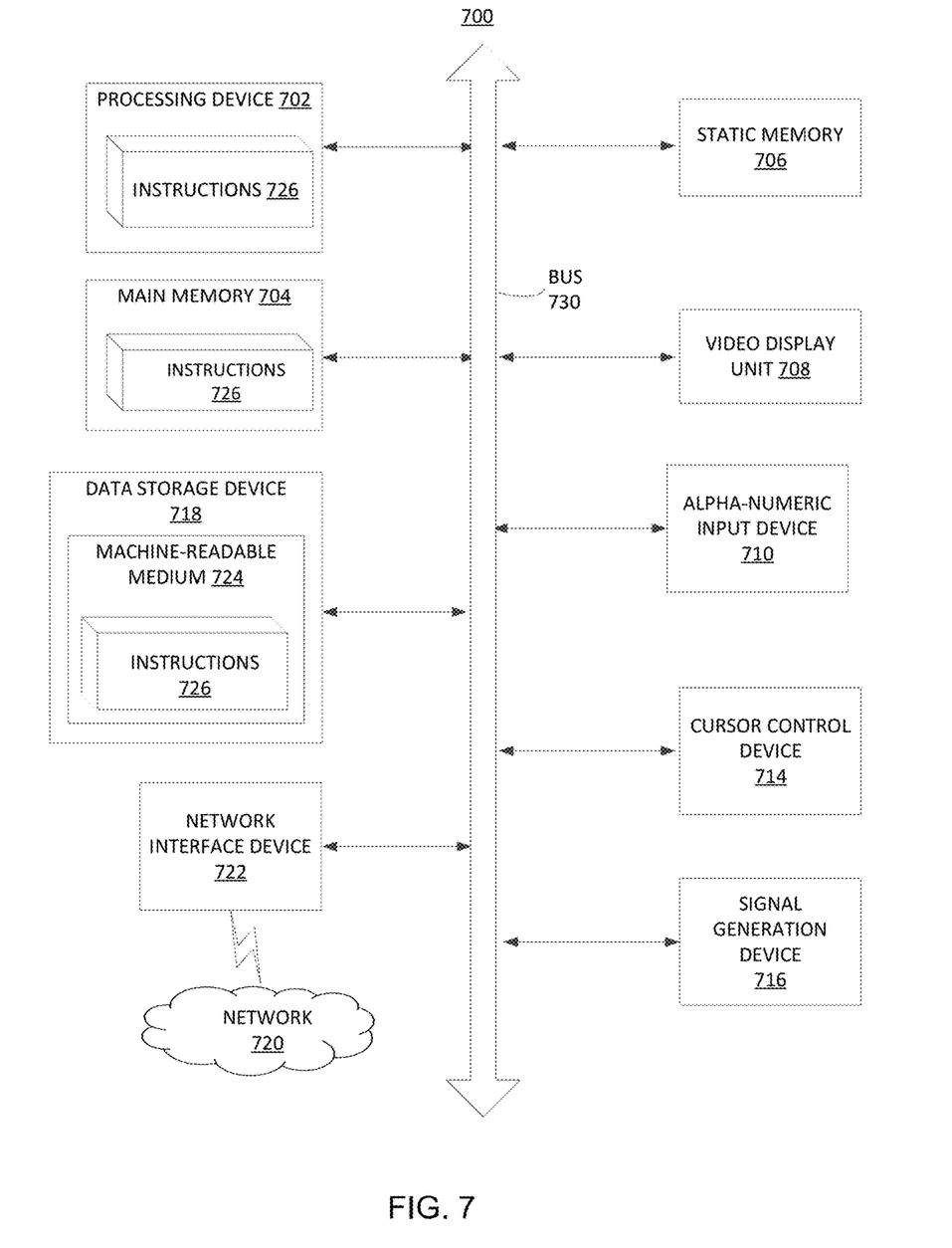
FIG. 7 illustrates a diagrammatic representation of a machine in the example form of a computer system within which a set of instructions, for causing the machine to perform any one or more of the methodologies discussed herein, may be executed.

FIG. 7 illustrates a diagrammatic representation of a machine in the exemplary form of a computer system 700 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Smart TV, a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 708 (e.g., a liquid crystal display (LCD), a cathode ray tube (CRT), or a touch screen), an alphanumeric input device 710 (e.g., a keyboard), a cursor control device 714 (e.g., a mouse), and a signal generation device 716 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 720 via the network interface device 734.

While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A server comprising:
   at least one processing device in communication with a smart device, the smart device configured to:
   display a television program to a user, the television program comprising media content;
   generate a fingerprint of the content being displayed to the user; and
   display overlay content that is based on program information;
   computer-readable storage medium storing a database having a set of fingerprints associated with television programs, and storing instructions;
   wherein the database comprises:
   a first database having a first plurality of fingerprints associated with current programs;
   a second database having a second plurality of fingerprints associated with recently consumed programs at the smart device;
   a third database having a third plurality of fingerprints associated with all programs; and
   a probable-program-changes database having a fourth plurality of fingerprints corresponding to programs the user is most likely watching or about to watch at the smart device;
   wherein the at least one processing device is configured to search a plurality of databases of fingerprints until a match to the fingerprint of the content being displayed to the user is found, wherein the at least one processing device is configured to execute the instructions to:
   receive, from the smart device, the fingerprint of the content being displayed to the user;
   execute a search of the first database to determine whether the fingerprint matches one of the first plurality of fingerprints;
   responsive to finding a match in the first database between the fingerprint and the first plurality of fingerprints, send program information of a program corresponding to the matched fingerprint to the smart device;
   responsive to not finding a match in the first database, execute a search of the second database to determine whether the fingerprint matches one of the second plurality of fingerprints;
   responsive to finding a match in the second database between the fingerprint and the second plurality of fingerprints, send program information of a program corresponding to the matched fingerprint to the smart device;
   responsive to not finding a match in the second database, execute a search of the probable-program-changes database to determine whether the fingerprint matches one of the fourth plurality of fingerprints;
   responsive to finding a match in the probable-program-changes database between the fingerprint and the fourth plurality of fingerprints, send program information of a program corresponding to the matched fingerprint to the smart device;
   responsive to not finding a match in the probable-program-changes database, execute a search of the third database to determine whether the fingerprint matches one of the third plurality of fingerprints;
   responsive to finding a match in the third database between the fingerprint and the third plurality of fingerprints, send program information of a program corresponding to the matched fingerprint to the smart device; and
   responsive to not finding a match in the third database, send a notification to the smart device indicating no match was found.

2. The server of claim 1, wherein the program information comprises an identification of the program and starting and ending times of the program.

3. The server of claim 1, wherein the program information comprises timing of commercials before the commercials are aired during the program.

4. The server of claim 1, wherein the at least one processing device is further configured to:
   track favorite programs watched most often by the user;
   narrow the search of the third database to select fingerprints, from among the third plurality of fingerprints, corresponding to the favorite programs;

responsive to finding a match during the narrowed search of the third database, send program information of a program corresponding to the matched fingerprint to the smart device; and responsive to not finding a match during the narrowed search of the third database, execute another search of the third database to determine whether the fingerprint matches one of the third plurality of fingerprints.

5. The server of claim 1, wherein the at least one processing device is further configured to:
track a sequence of programs as normally watched chronologically by the user;
determine a subset of the set of fingerprints corresponding to programs the user is most likely watching or about to watch based on the sequence of programs; and
populate the probable-program-changes database with the subset of the set of fingerprints.

6. The server of claim 5, wherein the at least one processing device is further configured to:
determine a probability that the user is watching or about to watch a program from the sequence of programs; and
populate the probable-program-changes database with the subset of the set of fingerprints when the probability is above a threshold probability.

7. The server of claim 1, wherein the at least one processing device is further configured to:
track a sequence of programs as normally watched chronologically by most viewers;
determine a subset of the set of fingerprints corresponding to programs the viewers are most likely watching or about to watch based on the sequence of programs; and
populate the probable-program-changes database with the subset of the set of fingerprints.

8. The server of claim 1, wherein the at least one processing device is further configured to:
determine a subset of the set of fingerprints corresponding to programs the user is most likely watching or about to watch based on a time of day; and
populate the probable-program-changes database with the subset of the set of fingerprints.

9. A method comprising:
receiving, by at least one processing device and from a smart device, a fingerprint of media content being displayed to a user, wherein the least one processing device is in communication with the smart device and has access to a computer-readable storage medium, wherein the computer-readable storage medium stores a database having a set of fingerprints associated with television programs, wherein the database comprises: (i) a first database having a first plurality of fingerprints associated with current programs, (ii) a second database having a second plurality of fingerprints associated with recently consumed programs at the smart device, (iii) a third database having a third plurality of fingerprints associated with all programs, and (iv) a probable-program-changes database having a fourth plurality of fingerprints corresponding to programs the user is most likely watching or about to watch at the smart device;
executing, by the at least one processing device, a search of a plurality of databases of fingerprints until a match to the fingerprint of content being displayed to the user is found, wherein the at least one processing device is configured to perform a search of the first database to determine whether the fingerprint matches one of the first plurality of fingerprints;

responsive to finding a match in the first database between the fingerprint and the first plurality of fingerprints, sending, by the at least one processing device, program information of a program corresponding to the matched fingerprint to the smart device;

responsive to not finding a match in the first database, executing, by the at least one processing device, a search of the second database to determine whether the fingerprint matches one of the second plurality of fingerprints;

responsive to finding a match in the second database between the fingerprint and the second plurality of fingerprints, sending, by the at least one processing device, program information of a program corresponding to the matched fingerprint to the smart device;

responsive to not finding a match in the second database, executing, by the at least one processing device, a search of the probable-program-changes database to determine whether the fingerprint matches one of the fourth plurality of fingerprints;

responsive to finding a match in the probable-program-changes database between the fingerprint and the fourth plurality of fingerprints, sending, by the at least one processing device, program information of a program corresponding to the matched fingerprint to the smart device;

responsive to not finding a match in the probable-program-changes database, executing, by the at least one processing device, a search of the third database to determine whether the fingerprint matches one of the third plurality of fingerprints;

responsive to finding a match in the third database between the fingerprint and the third plurality of fingerprints, sending, by the at least one processing device, program information of a program corresponding to the matched fingerprint to the smart device; and responsive to not finding a match in the third database, sending, by the at least one processing device, a notification to the smart device indicating no match was found.

10. The method of claim 9, wherein the smart device is configured to (i) display a television program to the user, the television program comprising the media content, (ii) generate the fingerprint of the media content being displayed to the user and (iii) display overlay content that is based on program information.

11. The method of claim 9, wherein the program information comprises an identification of the program and starting and ending times of the program.

12. The method of claim 9, wherein the program information comprises timing of commercials before the commercials are aired during the program.

13. The method of claim 9, further comprising:
tracking, by the at least one processing device, favorite programs watched most often by the user;
narrowing, by the at least one processing device, the search of the third database to select fingerprints, from among the third plurality of fingerprints, corresponding to the favorite programs;
responsive to finding a match during the narrowed search of the third database, sending, by the at least one processing device, program information of a program corresponding to the matched fingerprint to the smart device; and
responsive to not finding a match during the narrowed search of the third database, executing, by the at least one processing device, another search of the third database to determine whether the fingerprint matches one of the third plurality of fingerprints.

14. The method of claim 9, further comprising:
tracking, by the at least one processing device, a sequence of programs as normally watched chronologically by the user;
determining, by the at least one processing device, a subset of the set of fingerprints corresponding to programs the user is most likely watching or about to watch based on the sequence of programs; and
populating, by the at least one processing device, the probable-program-changes database with the subset of the set of fingerprints.

15. The method of claim 14, further comprising:
determining, by the at least one processing device, a probability that the user is watching or about to watch a program from the sequence of programs; and
populating, by the at least one processing device, the probable-program-changes database with the subset of the set of fingerprints when the probability is above a threshold probability.

16. The method of claim 9, further comprising:
tracking, by the at least one processing device, a sequence of programs as normally watched chronologically by most viewers;
determining, by the at least one processing device, a subset of the set of fingerprints corresponding to programs the viewers are most likely watching or about to watch based on the sequence of programs; and
populating, by the at least one processing device, the probable-program-changes database with the subset of the set of fingerprints.

17. The method of claim 9, further comprising:
determining, by the at least one processing device, a subset of the set of fingerprints corresponding to programs the user is most likely watching or about to watch based on a time of day; and
populating, by the at least one processing device, the probable-program-changes database with the subset of the set of fingerprints.

18. A non-transitory computer readable medium having stored thereon instructions executable by at least one processing device to cause the at least one processing device to perform operations comprising:
receiving, from a smart device, a fingerprint of media content being displayed to a user, wherein the least one processing device is in communication with the smart device and has access to the non-transitory computer-readable storage medium, wherein the non-transitory computer-readable storage medium stores a database having a set of fingerprints associated with television programs, wherein the database comprises: (i) a first database having a first plurality of fingerprints associated with current programs, (ii) a second database having a second plurality of fingerprints associated with recently consumed programs at the smart device, (iii) a third database having a third plurality of fingerprints associated with all programs, and (iv) a probable-program-changes database having a fourth plurality of fingerprints corresponding to programs the user is most likely watching or about to watch at the smart device;
executing a search of a plurality of databases of fingerprints until a match to the fingerprint of content being displayed to the user is found, wherein the search comprises a search of the first database to determine whether the fingerprint matches one of the first plurality of fingerprints;
responsive to finding a match in the first database between the fingerprint and the first plurality of fingerprints, sending program information of a program corresponding to the matched fingerprint to the smart device;
responsive to not finding a match in the first database, executing a search of the second database to determine whether the fingerprint matches one of the second plurality of fingerprints;
responsive to finding a match in the second database between the fingerprint and the second plurality of fingerprints, sending program information of a program corresponding to the matched fingerprint to the smart device;
responsive to not finding a match in the second database, executing a search of the probable-program-changes database to determine whether the fingerprint matches one of the fourth plurality of fingerprints;
responsive to finding a match in the probable-program-changes database between the fingerprint and the fourth plurality of fingerprints, sending program information of a program corresponding to the matched fingerprint to the smart device;
responsive to not finding a match in the probable-program-changes database, executing a search of the third database to determine whether the fingerprint matches one of the third plurality of fingerprints;
responsive to finding a match in the third database between the fingerprint and the third plurality of fingerprints, sending program information of a program corresponding to the matched fingerprint to the smart device; and
responsive to not finding a match in the third database, sending a notification to the smart device indicating no match was found.

19. The non-transitory computer readable medium of claim 18, wherein the smart device is configured to (i) display a television program to the user, the television program comprising the media content, (ii) generate the fingerprint of the media content being displayed to the user and (iii) display overlay content that is based on program information.

20. The non-transitory computer readable medium of claim 18, the operations further comprising:
tracking a sequence of programs as normally watched chronologically by the user;
determining a subset of the set of fingerprints corresponding to programs the user is most likely watching or about to watch based on the sequence of programs; and
populating the probable-program-changes database with the subset of the set of fingerprints.

21. The non-transitory computer readable medium of claim 18, the operations further comprising:
tracking a sequence of programs as normally watched chronologically by most viewers;
determining a subset of the set of fingerprints corresponding to programs the viewers are most likely watching or about to watch based on the sequence of programs; and
populating the probable-program-changes database with the subset of the set of fingerprints.

* * * * *